United States Patent [19]

Liepert

[11] 4,164,234

[45] Aug. 14, 1979

[54] METERING DEVICE

[75] Inventor: Rudolf Liepert, Augsburg, Fed. Rep. of Germany

[73] Assignee: Georg Spiess GmbH, Gersthofen, Fed. Rep. of Germany

[21] Appl. No.: 834,225

[22] Filed: Sep. 19, 1977

[30] Foreign Application Priority Data

Sep. 27, 1976 [DE] Fed. Rep. of Germany ....... 2643381

[51] Int. Cl.² .............................................. B65H 3/08
[52] U.S. Cl. ...................................... 137/51; 137/58;
271/108
[58] Field of Search ...................... 137/51, 58; 271/108

[56] References Cited

U.S. PATENT DOCUMENTS

| 1,417,808 | 5/1922 | Dewey | 137/625.47 |
| 3,761,077 | 9/1973 | Vollrath | 271/108 |

*Primary Examiner*—Robert G. Nilson
*Attorney, Agent, or Firm*—Max Fogiel

[57] ABSTRACT

An arrangement for metering a blast of air delivered to a driven machine, particularly a sheet separation device of a sheet feeder. A control slide is connected via an air intake opening to a pressure source, and the control slide has an air discharge opening connected to the driven machine and leading into the open. The latter opening is controlled or disconnected during upward movement or stoppage of the machine coupled to the driven machine by means of a control element actuated as a function of the machine speed. The air intake opening and the air discharge opening leading to the driven machine, face each other coaxially, and upon reaching a set final speed, these openings are connectable by means of a coaxial recess passing through the control element. A rotary valve plug with a through-bore is provided to form the control element. The air discharge opening leads to the outside and is located offset relative to the air intake opening in the valve plug direction of rotation corresponding to a speed reduction. The through-bore of the valve plug in this region has an oppositely-directed expansion corresponding to the amount of offset. The valve plug is connected by a crank arm mounted on a bearing trunnion, and this crank arm is connected to a servomotor operating as a function of the machine speed.

13 Claims, 4 Drawing Figures

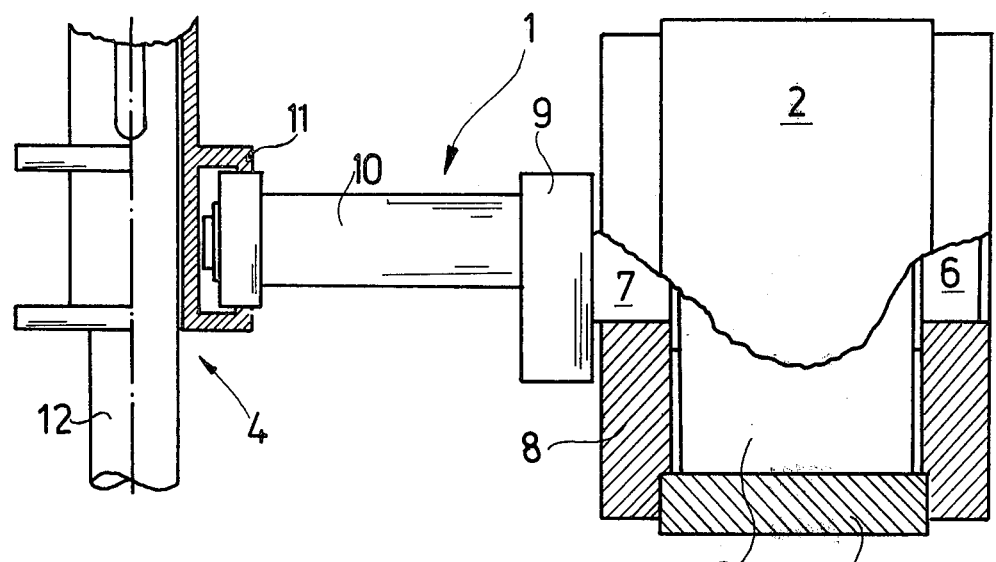
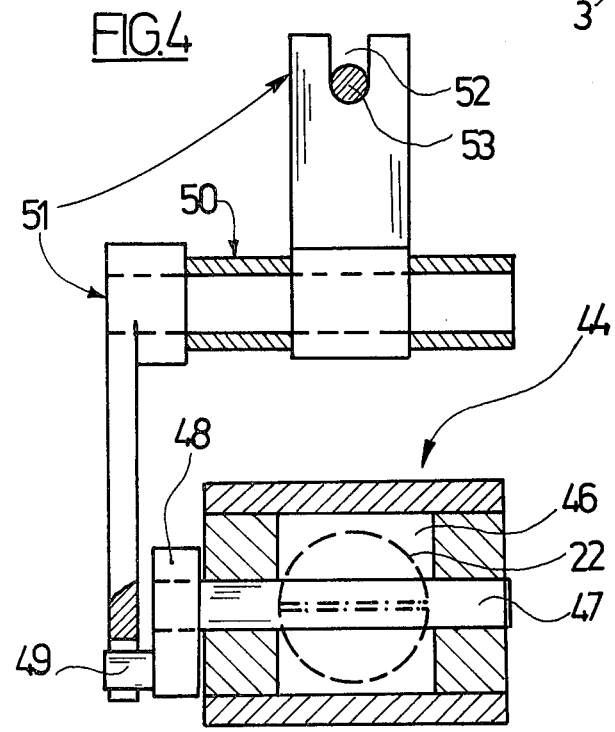

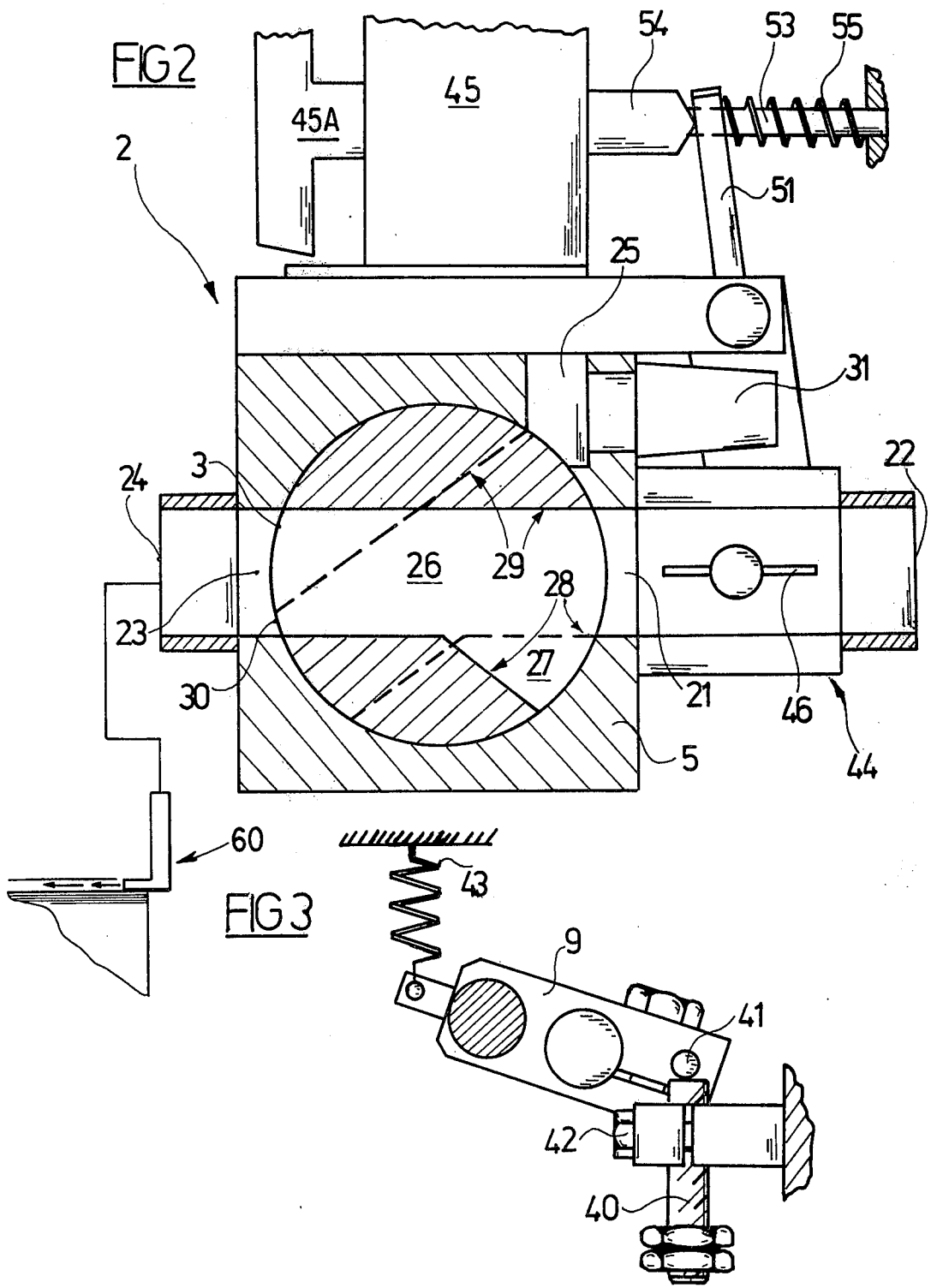

METERING DEVICE

BACKGROUND OF THE INVENTION

The present invention relates to a device for metering the blast air delivered to a driven machine, particularly the sheet separation device of a sheet feeder, with a control slide connected via an air intake opening to a pressure source; this control slide has an air discharge opening connected to the driven machine and leading into the open; the opening can be controlled or disconnected during the upward movement or stoppage of the machine coupled with the driven machine by means of a control element actuated as a function of the machine speed.

An arrangement of this type during the starting process of, e.g., a sheet feeder makes possible adaptation to the requirement of the air blast delivered to the sheet separator. An immediate application to the sheet separator of the full amount of air adapted to the standard operating speed would have the result that the top sheets of the sheet stack during the start-up process would not only be loosened, but would be blown all over.

An arrangement of the initially described type is already known. Compared to the previously known manually actuated adjustment device, this known device represents considerable progress. However, various disadvantages of the known devices are caused by the unfavorable air delivery in the region of the control slide, which is formed here by a cylinder provided with radial air connections and a double-piston which can move inside it and has a control groove. The air intake opening formed by a radial bore and the two air discharge openings are diametrally opposite and are offset in the axial direction in such a way that the control groove in the end positions of the double piston connects each time only one air discharge opening with the air intake opening and the other air discharge opening is cut off, except for a small advance air gap. Based on this axial offset, the air current undergoes a considerable deflection corresponding to the offset which may lead to considerable flow losses. The flow around the connection between the two piston portions suggests an additional increase of the flow losses. Such flow losses have a negative effect particularly during the normal operation which requires complete air delivery to the driven machine. This was accomplished in the past by enlarging the air pumps to compensate for the steady losses. However, this leads not only to a simultaneous increase of the power consumption, but also to increased space requirement and weight and thus not only an increase in operating costs, but also an increase in manufacturing costs. The disadvantages involved is seen in the evidently poor efficiency.

There is already known another compressed air control device for sheet feeders where an air line is closed by means of a valve (slide) which is slid across the line cross-section as a function of the machine rpm. The flow in the air line with the slide pulled out does not experience deflection. In contrast to the initially discussed arrangement, the known arrangement in the lower speed range does not experience a division of the air into a partial flow leading to the driven machine and a remaining partial flow leading to the outside. Therefore, it is possible that during the starting process in the area of the throttle valve (slide) projecting into the line cross-section there results a considerable air excess and hence a corresponding air stagnation which affects the pump ahead of it and may lead to overloading the pump and the entire pump driven which again requires "beefing up" (overdimensioning) and may have a negative effect on the life and the efficiency. Aside from this, DL-PS- 85 367 involves only schematic sketches. The practical execution of the afore-mentioned slide arrangement leads to arrangements which, as the initial arrangement, involve deflection and flow losses.

It is, therefore, an object of the present invention to provide an arrangement of the initially described type where during normal operation line losses in the area of the control slides are avoided and which can be equipped with relatively light pumps whose manufacturing and operating costs are low and whose overloading is effectively prevented.

Another object of the present invention is to provide an arrangement of the foregoing character which may be easily maintained in service and has a substantially long operating life.

SUMMARY OF THE INVENTION

The objects of the present invention are achieved by providing an arrangement of the initially-mentioned type with a control slide connected via an air intake opening connected to a pressure source which has an air discharge opening connected to the driven machine and an air discharge opening leading to the outside which during the raising or stopping of the machine coupled to the driven machine, so that it can be controlled or shut off by means of a control element actuated as a function of the machine rpm, in a surprisingly simple manner by having air intake opening and air discharge opening leading to the driven machine face each other coaxially. Upon reaching the set final rpm, they are connectable by means of a coaxial recess passing through the control element. As a result, the air at full speed and hence full air requirement encounters a straight unblocked flow path so that line losses are eliminated as much as possible. At the same time, the retention of the advantages inherent in an air split-up during starting are ensured. The design and manufacturing expense for the measures in accordance with the invention remains negligibly small. The measures in accordance with the present invention promise a particularly high efficiency and a long life.

In accordance with a particularly simple and expedient embodiment of the present invention, to form the control element, a rotary stopcock (valve) plug is provided with a through-bore. The air discharge opening, leading to the outside, opposite the air intake opening may be offset in the direction of rotation of the plug, corresponding to a speed reduction, and the through-bore of the plug may in this area be provided with an oppositely-directed enlargement corresponding to the amount of offset. With an offset of the plug in the direction of speed reduction, i.e., an opening of the air discharge opening leading to the outside and a closing of the air discharge opening leading to the driven machine, there results an inclination of the axis of the through-bore of the valve. This inclination corresponds to the angle of rotation, relative to the common axis of the facing air intake opening and the air discharge opening leading to the driven machine. This oblique position in an advantageous manner causes a slight stagnation which brings about a quick and effective outflow of the excess air through the air discharge opening leading to the outside; a noticeable overload of the pump is avoided. The air discharge line leading to the outside, to reduce noise, may be provided with a damper without deterioration of the flow-off conditions.

Another advantageous embodiment of the invention is that the plug during stoppage of the machine can be placed into a ready position which is adjustable to the amount of preliminary air required for starting. This ensures immediate readiness of the machine for a restart.

In accordance with another embodiment of the invention, a shut-off slide may be provided in the air supply line ahead of the control slide, by means of which the air supply to the control slide can be shut off when the machine stops. These measures ensure an immediate interruption of the air flow in case of emergencies,—an emergency stop so that the sheet stack order is not jeopardized. This shut-off slide may be actuated by means of a solenoid. There may be simple coupling with diverse monitoring devices even over large distances, also ensuring short response times.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawings.

BRIEF DESCRIPTION OF THE DRAWING

FIG. 1 shows a view of the metering device, partially in a section;

FIG. 2 shows a section taken through a preferred embodiment of a control slide in accordance with the present invention;

FIG. 3 shows an example for an arrangement for preliminary air adjustment; and

FIG. 4 shows an example for the main air shutoff.

DESCRIPTION OF THE PREFERRED EMBODIMENT

FIG. 1 shows a metering device intended for installation in a sheet feeder and is denoted by 1; by means of this metering device the start-up blast air supplied during the up-travel of the sheet feeder of a sheet separator 60 can be metered dependent on the rpm. This avoids that in the lower speed ranges, the upper sheets of the sheet stack are blown away because of too much air. The metering device 1 comprises a control slide 2, which is integrated in the air line leading from a blower as pressure source to the sheet separator device as driven machine; the control element 3 of this slide is actuated depending on the rpm by means of a centrifugal governor indicated at 4. The control element 3 is formed in this case by a valve plug located rotatably in a housing block 5 having a suitable borehole; this plug is held in lateral housing covers 8, screw-fastened to housing block 5, with lateral bearing trunnions 6 and 7. The bearing trunnion 7 mounts a crank arm 9 which is provided with an axis-offset adjusting rod 10 engaging bushing 11 of the centrifugal governor 4. Thus the control element 3 formed by the valve plug can be rotated as a function of the rpm of the single-revolution shaft at 12 which operates in conjunction with the centrifugal governor 4. Metering devices of this type are located to advantage as close as possible to the suction head of the sheet feeder, for example, in the area of a side wall.

During a revolution of shaft 12, bushing 11 is displaced by an amount depending on the speed of the shaft in the axial direction of the shaft. The crank arm 9, connected to the bearing trunnion 7 of valve plug 3 has an adjusting rod 10 offset from the bearing trunnion 7. This rod 10 engages bushing 11, converting the axial displacement of bushing 11 by crank arm 9 into a rotary motion of bearing trunnion 7 and hence of valve plug 3. The mode of operation of a crank provided with axially offset trunnions is known. The rotary motion of bushing 11 has no influence on rod 10 since the rod 10, as shown in FIG. 1, engages a peripheral groove of bushing 11.

The housing block 5, as seen in FIG. 2, has an air intake opening 21 to which an air line branch 22 leading to the blower (not shown) is connected. The air intake opening 21 diametrally opposite is a coaxial air discharge opening 23 of the same cross-section to which another air line branch 24 is connected; the latter leads to the sheet separating device (not shown). Also, the housing block 5 has another air discharge opening 25 leading to the outside; it is offset relative to the air intake opening by 40°. The air intake opening 21 and the air discharge openings 23 and 25 can be formed by radial drill holes. In the embodiment shown, the air discharge opening 25 is formed by a pocket-like mill cut. To form a flow path from the air intake opening 21 to the two air discharge openings 23 and 25, the valve plug forming control element 3 has a suitable recess which in this case is formed by a diametral through-bore 26 of the same diameter as the air intake opening 21 and the air discharge opening 23. An expansion 27 is present in the vicinity of the side facing the air intake opening 21 and the air discharge opening 25 leading to the outside. The expansion 27 can be produced by a milling cut inclined relative to the axis of the through-bore 26 and of the same diameter as the through-bore 26 so that the boundary edge 28 of the expansion 27 and the facing edge 29 of the through-bore 26 subtend the same angles as the outer edges, not facing each other, of the air intake opening 21 and the air discharge opening 25 leading to the outside.

In the standard operating position corresponding to the full machine rpm, the valve plug 3 is to be held by the centrifugal governor 4 in the position indicated by solid lines in FIG. 2. In this operating position, the through-bore 26 is lined up with the drill holes forming the air intake opening 21 and the air discharge opening 23 leading to the driven machine. The expansion 27 is covered and blocked by the adjacent housing wall. The full air quantity furnished by the blower is delivered to the sheet separating device, without any deflection in the vicinity of the control slide 2 of the present invention, so that the line losses in this region are eliminated to a high degree. This advantage becomes manifest with the relatively low pressures of 1 atm gage since here relatively small losses have a relatively high percentage effect on the end result. Upon stoppage of the machine, the air supply is interrupted and the valve plug 3 is turned by the centrifugal governor 4 into the ready-position indicated by broken lines in FIG. 2; here a flow path, formed by expansion 27 and the adjacent region of through-bore 26, is available from the air intake opening 21 to the air discharge opening 25 leading to the outside. The air discharge 23 leading to the driven machine in this case is entirely, or, as shown in FIG. 2, shut off except for a gap 30 required for start-up air. When the air supply is resumed upon starting the machine, not the entire air quantity, but only the set start-up air is applied to the sheet separating device, the remainder of the air quantity furnished by the blower escapes to the outside vai air discharge opening 25. Because of the inclined position of the through-bore 26 relative to the air intake opening 21 there is a slight stagnation which favors escape of the remaining air through the air discharge opening 25 leading to the outside. Hence, constant delivery blowers can be used without the hazard of an overload to excessive backwash. To dampen the noise suitable damping elements 31 can be placed on the air discharge opening 25. With increased speed, the centrifugal governor 4 acts and turns the valve plug 3 back more and more till the position shown by solid lines in FIG. 2 is reached. In this position in which the air flowing through the control slide 2 encounters a straight flow path, the valve plug 3 is held until the next machine stop.

The above-mentioned start-up air depends on the type of paper to be handled. For setting gap 30, as shown in FIG. 3, a stop screw 40 may be provided where the crank arm 9 with pin 41 strikes, thus restricting the adjustment stretch of the valve plug 3. By turning the screw 40, any gap position desired can be set. In the embodiment shown, the adjustable stop screw 40 in turn is secured by a fixing screw 42. A spring 43 engaging the crank arm 9 makes sure that the pin is in contact with the stop screw while the machine is at rest.

To interrupt the air supply upon machine stop, a shut-off slide suggested at 44 in FIG. 2 may be provided ahead of a control slide 2; this shut-off slide is actuated via a solenoid which in turn may act in conjunction with the sheet monitoring devices and can be automatically actuated by them. The solenoid 45 is preferably wired so that the unenergized position is the closed position of the shut-off slide 44. This makes sure that with an accidental current failure the air supply is interrupted in any case. The solenoid 45 is preferably arranged so that the solenoid core position corresponding to a free air passage for restarting the machine can be set by handle 45A. In the embodiment shown, the shut-off slide 44 has a rotary flap 46. As shown best by FIG. 4, the flap 46 may be of rectangular shape so that the line cross-section of branch 22 of the air line can be reliably shut off. Flap 46, as shown in FIG. 4, is fastened and mounted on a shaft 47 which rotates in the housing of the shut-off slide 44; this shaft 47 has a crank arm 48 which acts via a trunnion 49 with one arm of a valve rocker 51 rotating around 50 whose other lever arm has a fork groove 52 holding a rod 53 connected to the solenoid. The valve rocker 51 permits bridging of a relatively long distance and simultaneously an enlargement or reduction of the motions of the armature of the solenoid 45. The solenoid 45 may, as indicated in FIG. 2, be mounted on the control slide 2. As shown in FIG. 2, rod 53 can be provided with an engaging piece 54 which maintains contact with the associate lever arm of the valve rocker 51 via a spring 55 held by the housing. If the solenoid 45 could be accommodated in the narrow area of the shut-off slide 44, it might be conceivable to couple the armature directly with crank arm 48. To avoid a backwash affecting the blower upon actuation of the shut-off slide 44, relief pressure valves (not shown) may be provided in the present embodiment.

The above describes a preferred embodiment of the invention, without constituting a restriction. There are a number of possibilities open to the expert to adapt the general idea of the invention to the conditions of an individual case.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for metering a blast of air delivered to a driven machine, particularly a sheet separation device of a sheet feeder, comprising: a pressure source; a control element connected via an air intake opening to said pressure source; said control element having a first air discharge opening connected to the driven machine and a second air discharge opening leading into the open; said control element actuated as a function of machine speed; said first air discharge opening being controlled or disconnected during upward movement or stoppage of said sheet feeder by said control element; said control element comprising a rotary valve plug with a through-bore, said through-bore being aligned coaxially with said air intake opening and with said first air discharge opening facing each other diametrically, said first air discharge opening leading to said sheet separation device; said second air discharge opening leading to the outside being offset relative to said air intake opening in the direction of rotation of said valve plug corresponding to speed reduction, said through-bore of said valve plug having expansion means, said expansion means enlarging a region adjacent to said air intake opening in a direction opposite to the direction of rotation associated with speed reduction.

2. A metering device as claimed in claim 1 including a crank arm mounted on a bearing trunnion and connected to said valve plug; and control means connected to said crank arm and operating as a function of the speed of the machine.

3. A metering device as defined in claim 2 wherein said control means comprises a centrifugal governor with bushing engaging a pin fastened to said crank arm parallel to said trunnion, said bushing being displaced by an amount depending on speed of said driven machine and moving said crank arm to rotate said trunnion and said rotary valve plug.

4. A metering device as defined in claim 1 wherein said valve plug has means for adjusting to a position which is adjustable for setting the required air for start-up.

5. A metering device as defined in claim 4 including an adjustable stop screw for restricting pivot motion of said crank arm.

6. A metering device as defined in claim 5 including an adjusting spring, said crank arm contacting said stop screw by means of said adjusting spring.

7. A metering device as defined in claim 1 including damper means in said air discharge opening leading to the outside.

8. A metering device as defined in claim 1 including an air supply line having a shut-off slide ahead of said control slide for stopping supply of air to said control slide during machine stoppage.

9. A metering device as defined in claim 8 including solenoid means for actuating said shut-off slide.

10. A metering device as defined in claim 9 wherein said solenoid means has a de-energized state corresponding to the closed position of said shut-off slide.

11. A metering device as defined in claim 9 wherein said solenoid means is actuated automatically during machine stoppage and is actuated manually when starting the machine.

12. A metering device as defined in claim 10 wherein said shut-off slide has a rotary flap actuated by means of a crank arm mounted on a shaft.

13. A metering device as defined in claim 1 including a crank arm mounted on a bearing trunnion and connected to said valve plug; control means connected to said crank arm and operating as a function of the speed of the machine; said control means comprising a centrifugal governor with bushing engaging a pin fastened to said crank arm parallel to said trunnion, said bushing being displaced by an amount depending on speed of said driven machine and moving said crank arm to rotate said trunnion and said rotary valve plug; said valve plug having means for adjusting to a position which is adjustable for setting the required air for start-up; an adjustable stop screw for restricting pivot motion of said crank arm; an adjusting spring, said crank arm contacting said stop screw by means of said adjusting spring; damper means in said air discharge opening leading to the outside; an air supply line having a shut-off slide ahead of said control slide for stopping supply of air to said control slide during machine stoppage; solenoid means for actuating said shut-off slide; said solenoid means having a de-energized state corresponding to the closed position of said shut-off slide; said solenoid means being actuated automatically during machine stoppage and being actuated manually when starting the machine; said shut-off slide having a rotary flap actuated by means of a crank arm mounted on a shaft.

* * * * *